United States Patent [19]

Metz

[11] Patent Number: 4,692,075
[45] Date of Patent: Sep. 8, 1987

[54] PANEL FASTENER

[75] Inventor: Joseph R. Metz, Ridgefield, Conn.

[73] Assignee: Norco, Inc., Ridgefield, Conn.

[21] Appl. No.: 858,643

[22] Filed: May 2, 1986

[51] Int. Cl.⁴ .............................................. F16B 31/00
[52] U.S. Cl. ........................................ 411/7; 411/105
[58] Field of Search .................... 411/7, 6, 103, 105,
411/106, 107, 111, 112, 113, 326, 330, 331, 347, 353, 970, 999

[56] References Cited

U.S. PATENT DOCUMENTS

| 2,745,303 | 5/1956 | Cornelius | 411/6 X |
| 3,289,726 | 12/1966 | Sauter | 411/105 |
| 3,294,140 | 12/1966 | Cosenza | 411/963 X |
| 3,404,716 | 10/1968 | Cosenza | 411/105 |

FOREIGN PATENT DOCUMENTS

| 2030759 | 2/1971 | Fed. Rep. of Germany | 411/6 |
| 980500 | 1/1965 | United Kingdom | 411/326 |

Primary Examiner—Gary L. Smith
Assistant Examiner—Adrian H. Whitecomb, Jr.
Attorney, Agent, or Firm—H. Gibner Lehmann; K. Gibner Lehmann

[57] ABSTRACT

A screw-type fastener comprising two cooperable assemblages for releasably securing a panel having one of said assemblages to an underlying support structure such as a sub-panel or other framework having the other assemblage. The said other assemblage of the fastener comprises a tubular housing enclosing a screw member which projects forwardly to an open end of the housing, toward the opening thereof. The said one fastener assemblage comprises a floating stud body carried by the panel and having an internally threaded bore which is adapted to receive the screw member when the stud body is applied thereto. The housing has ratchet rings encircling the screw member, provided with opposed faces containing sloped radial teeth which engage one another. One ring is keyed to rotate with the stud body, and the other is keyed for longitudinal non-rotary movement in the housing. A spring in the housing maintains the rings in contact. The screw member is mounted for floating, turning movement in the housing, and is yieldably restrained by a unidirectional or non-reversing rotary detent as the stud body advances on the screw until a predetermined torque is reached. Thereafter the detent yields in the manner of a one-way ratchet or overload clutch to enable the screw member to turn with the stud body when the fastener is completely pulled up, thereby preventing overtightening. The limiting of the torque eliminates personnel-related error or misjudgements. Reverse turning of the stud body unscrews it from the screw member in a positive manner due to the one-way or non-reversing action of the detent.

18 Claims, 29 Drawing Figures

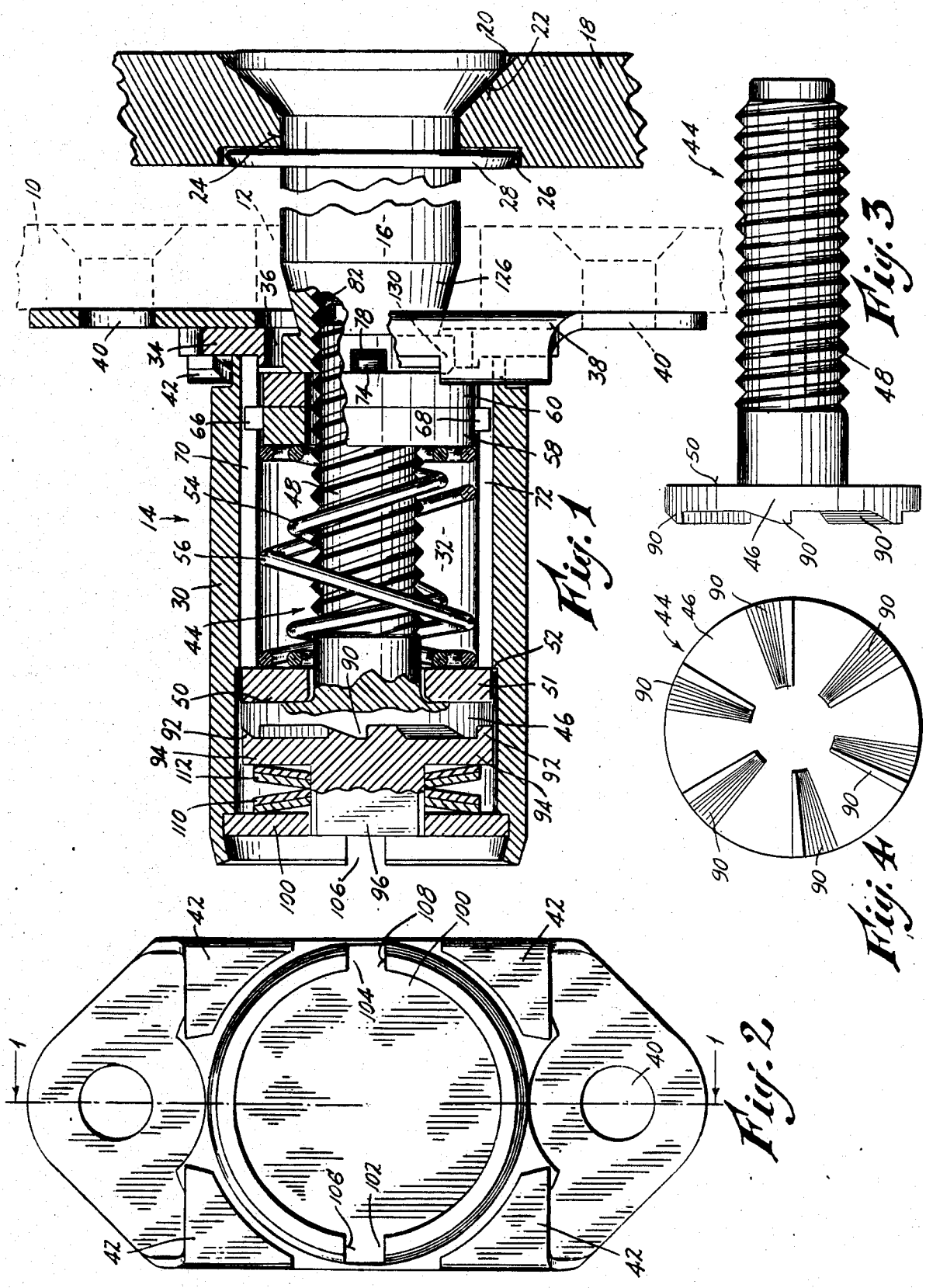

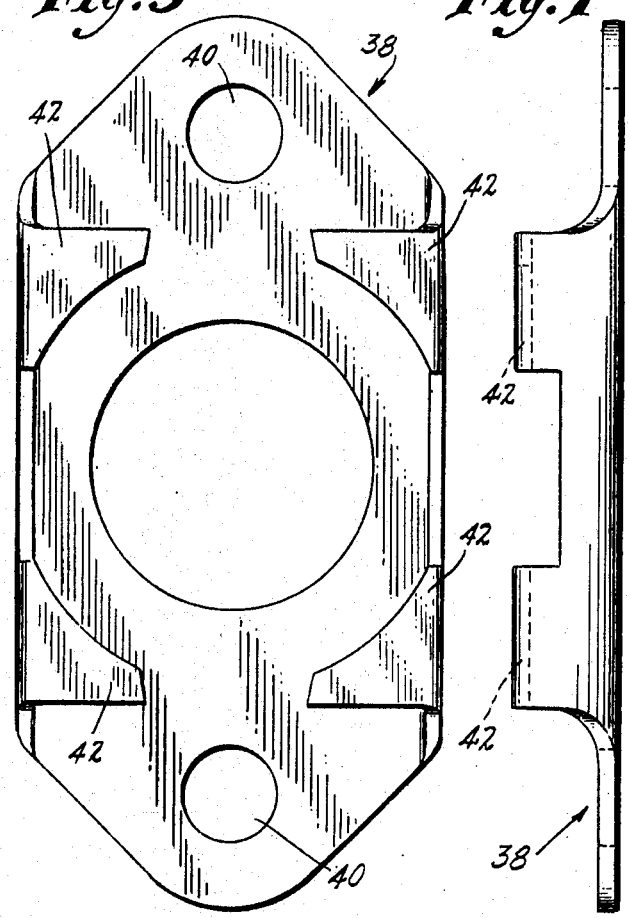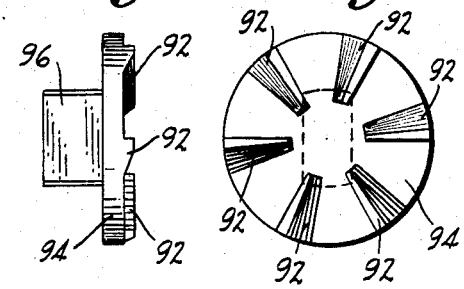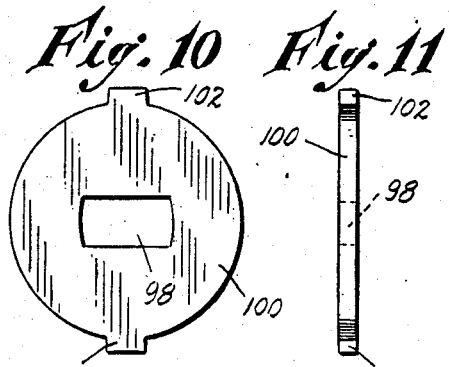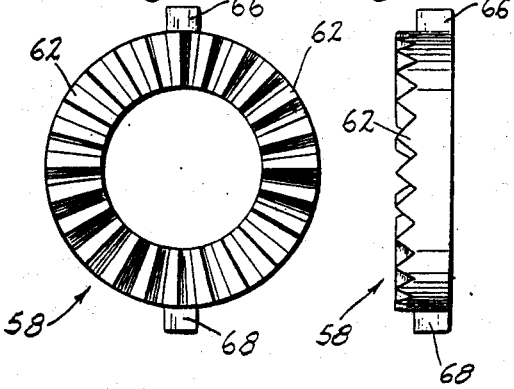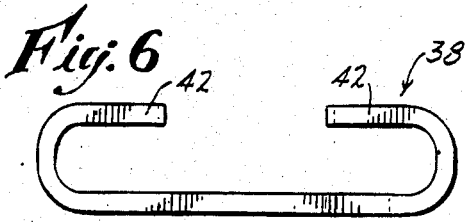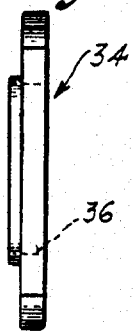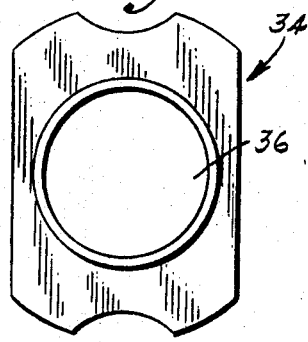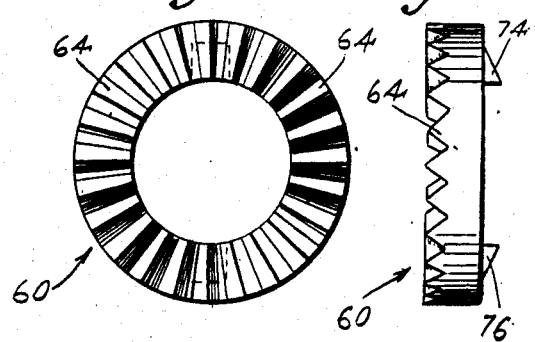

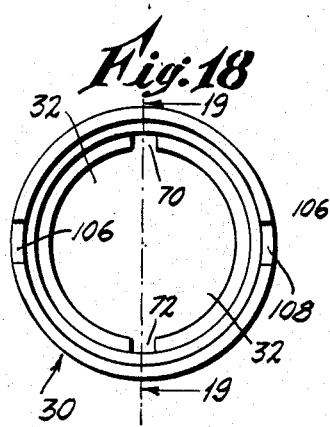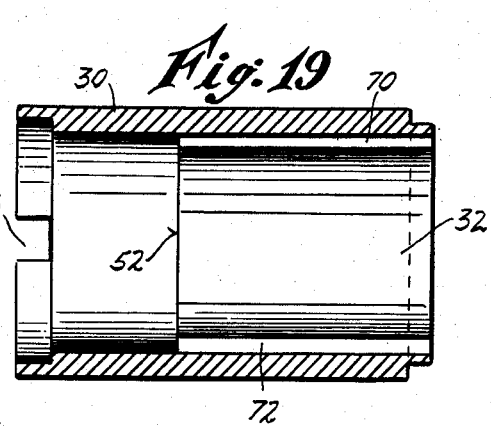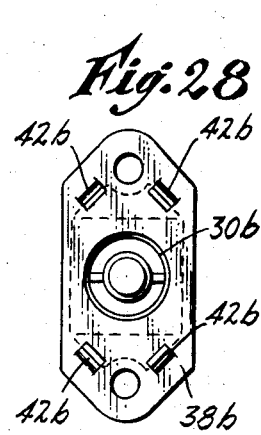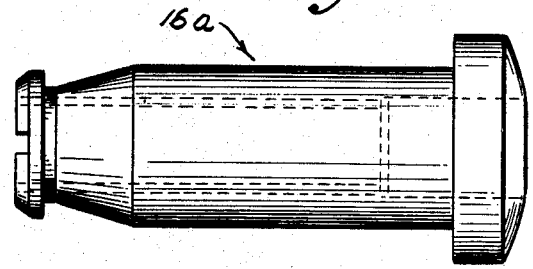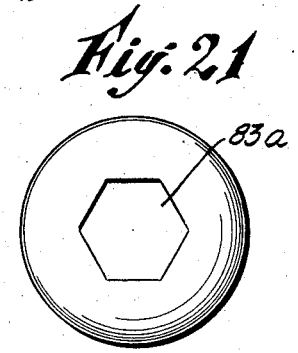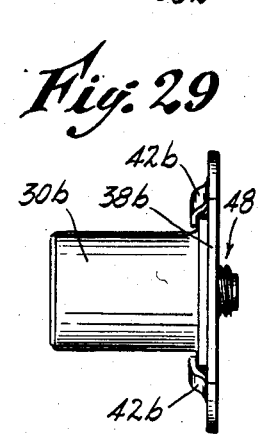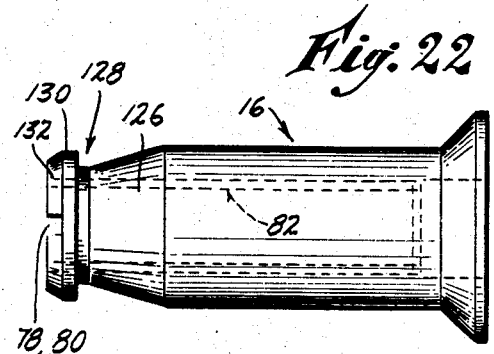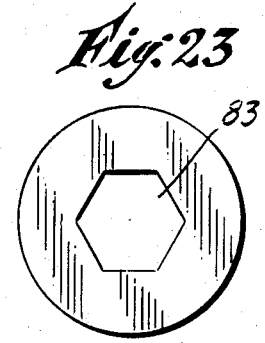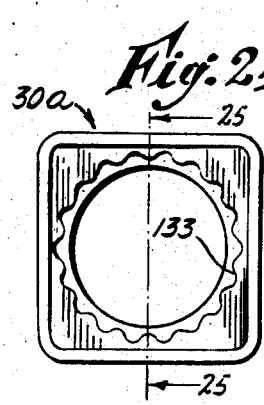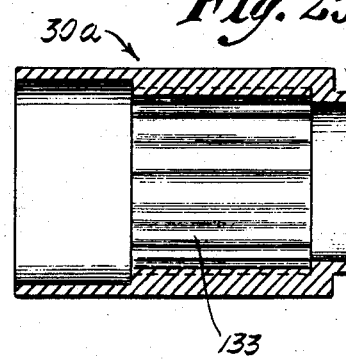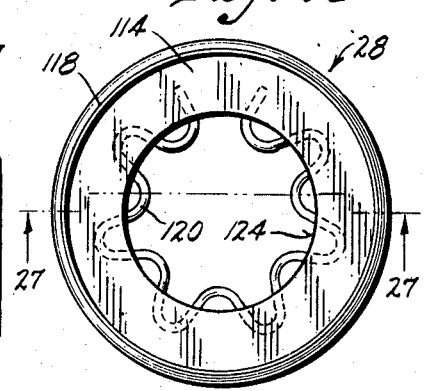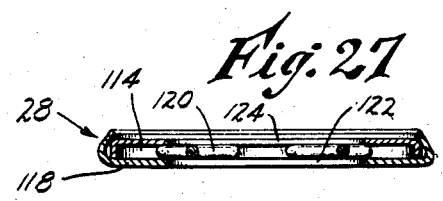

PANEL FASTENER

CROSS REFERENCES TO RELATED APPLICATIONS

Copending application of Joseph R. Metz U.S. Ser. No. 612,268 filed May 21, 1984, entitled PANEL FASTENER and having common ownership with the present application.

STATEMENT AS TO RIGHTS TO INVENTIONS MADE UNDER FEDERALLY-SPONSORED RESEARCH AND DEVELOPMENT

Research and development of the present invention and application have not been Federally-sponsored, and no rights are given under any Federal program.

BACKGROUND OF THE INVENTION

Field of the Invention

This invention relates generally to panel fastener devices of the type which are employed to secure, in a removable manner, a top panel to an underlying panel or support structure, and more particularly to devices of this type which incorporate a screw that is exposed at an access opening in the support structure and adapted to be engaged by an internally threaded fastener stud held captive in a corresponding opening of the panel.

DESCRIPTION OF THE RELATED ART INCLUDING INFORMATION DISCLOSED UNDER 37 CFR §§1.97–1.99

The invention relates more particularly to improvements in the panel fasteners illustrated and described in the copending application above identified, and in U.S. Pat. No. 3,294,140 dated Dec. 27, 1966 and issued to F. J. Cosenza.

The patented device shows a fastener of the type indicated above, comprising a housing mounted on a sub-structure or subpanel, in which housing there is rigidly carried a screw having a threaded part that projects toward an access opening in the sub-structure. The patented fastener further comprises a cooperable part in the form of a stud having an internally threaded bore, which stud is captive on an overlying panel and can be inserted into the access opening of the sub-panel so as to engage the threads of the screw therein, thereby to pull the overlying panel toward the sub-panel or supporting structure. The stud is held captive on the overlying panel by means of a retainer ring having inwardly projecting lugs which are seated in longitudinal grooves in the exterior surface of the stud. The screw is held captive in its housing and is fixed against rotation by means of lugs or tabs 53, as described in column 5, lines 50–53 of the patent. There are two ratchet rings which function to provide a detent action that minimizes the possibility of the stud inadvertently becoming unscrewed under severe operating conditions such as excessive vibration. The ratchet rings are maintained in engagement with one another by a coil spring that bears against the underside of the head of the screw.

While the above construction operated in a generally satisfactory manner as far as withstanding vibration and high temperatures, there existed a distinct drawback in that the studs were susceptible of overtightening by the installer. Also, problems arose with the improper "starting" of the threads during initial engagement of the stud and screw. Under such circumstances, damage to either the stud or screw could occur, rendering the entire assembly inoperative and necessitating replacement of the inoperative parts. Since panels of this type are frequently employed in aircraft, guided missiles, etc., where field maintenance is necessary, such replacements caused considerable problems. In addition, in the patented device the screw was rigidly held in position in the housing. Where there existed slight misalignments resulting from either manufacturing tolerances or perhaps warping of the panel or the underlying support structure, there could occur difficulty in properly "starting" the threads, if the fastener stud carried by the overlying panel did not properly align with the respective screw. Since no provision was made for enabling the screw to yield or shift position in the housing, even slightly, there was a possibility of binding or seizing of the parts. The above drawbacks in the patent constituted serious objections where screw-type fasteners were employed.

In the copending application above identified the disadvantages of the patented device are overcome. However, with the construction shown in the application the possibility still existed that difficulty could be experienced in the unscrewing of the fastener, if any binding or friction of the threads proved to be greater than the detent restraint of the means which prevented overtightening of the screw. In some instances, such as when appreciable rust or dirt formed on the threads, the threaded parts would not unscrew and separate easily.

SUMMARY OF THE INVENTION

The above disadvantages and drawbacks of prior panel fasteners and particularly the drawback of the fastener in the identified copending application are obviated by the present invention which has for an object the provision of an improved panel fastener which while still of simple construction is especially reliable in use and positively releasable or separable as to its parts, even after use over extended periods of time.

Another object of the invention is to provide an improved positive-release panel fastener as above set forth, wherein during each subsequent installation, the allowable torque is reliably automatically limited whereby there is eliminated the possibility of overtightening of the fastener stud and stripping or damaging of the screw threads on either the screw member or stud.

A further object of the invention is to provide an improved positive-release panel fastener as above characterized, wherein release of the fastener parts is quickly had regardless of any operator-related error, since no judgement is required on the part of the person removing the panel. The maximum torque which can be applied to the fastener is available to unscrew the parts, without diminution or adverse influence from other functions.

Still another object of the invention is to provide an improved positive-release panel fastener of the kind indicated, wherein accommodation is made for slight misalignments between the screw and fastener stud without upsetting the positive release action. Such misalignments typically occur as a result of manufacturing tolerances, or warping of one or more of the parts. When it is realized that at least four or more of such fasteners are usually employed with a particular panel, the likelihood of all of the bored and threaded studs aligning exactly with their corresponding screws is remote, at best. Such a circumstance might occur in certain instances, but it would probably result more from chance than from deliberate design and maintenance procedures that of necessity involve specific tolerances and freedom from warping, stresses, or other dimensional changes resulting from temperature fluctuations, etc.

Yet another object of the invention is to provide an improved positive-release panel fastener as outlined above, wherein the possibility of damage occurring to the fastener, particularly the positive-release and threaded parts thereof, is virtually eliminated, thereby greatly increasing the reliability and extending the useful life of the device.

A still further object of the invention is to provide an improved positive-release fastener as above set forth, which is especially resistant to malfunction from extreme operating conditions like temperature fluctuations, vibration, moisture, etc., thus making the device especially well suited for use in harsh environments such as where aircraft of one form or another are involved. It can be readily appreciated that a positive release, and reliable performance and long life are extremely important in vital installations, and that steps to avoid failure of equipment are undertaken wherever possible.

The above objects are accomplished by the provision of an improved panel fastener of the type which releasably secures an overlying panel to an underlying or support structure having an access opening, such improved fastener comprising a housing having a tubular bore in which there is disposed a screw member, means for securing the housing at the access opening of the underlying support structure, and an internally threaded, hollow fastener stud which is captive in an opening in the overlying panel, such opening being alignable with the access opening of the support structure. During initial installation, yieldable detent means in the housing engage the stud, offering nominal resistance against free turning and thus minimizing the possibility of subsequent loosening due to vibration. The screw member is mounted in the housing for turning movement, and a yieldable one-way action detent, separate and distinct from the above-mentioned detent means, is carried by the housing and normally impedes in one direction any turning of the screw member except under conditions where it experiences excessive torque, such as would result from overtightening of the fastener stud or possible improper "starting" of the threads of the screw member and those of the stud. The useful intended maximum applied driving torque to be experienced by the captive stud is set at a desired, predetermined figure, and if such figure is exceeded it will result in a yielding and restrained turning of the screw member that cooperates with the stud. Operator-related error is thereby eliminated from the installation procedure. The yieldable detent positively prevents relative turning in the opposite or releasing direction of the screw member, whereby a positive release of the fastener is assured at all times regardless of any rusting or dirt conditions. This is effective all without sacrificing simplicity or reliability in construction. Significantly extended life and positive release are thus had, and maintenance requirements are accordingly reduced.

Other features and advantages will hereinafter appear.

BRIEF DESCRIPTION OF THE DRAWINGS

In the drawings, illustrating several embodiments of the invention:

FIG. 1 is an axial sectional view of the improved panel fastener construction of the present invention, illustrating the underlying support structure and panel overlay associated therewith. One part of the fastener comprises a housing which is carried behind an access hole in the support structure, and a second part comprises a fastener stud which is held captive in a hole in the panel to be attached and which is intended to remain with said panel at all times. FIG. 1 is taken on the line 1—1 of FIG. 2.

FIG. 2 is a rear elevation of the housing part of the panel fastener construction of FIG. 1.

FIG. 3 is a side elevation of the screw member employed in the panel fastener of the invention.

FIG. 4 is a left end elevation of the screw member of FIG. 3.

FIG. 5 is a rear elevation of the mounting or clamping sleeve of the fastener construction, by which the fastener housing is secured to the underlying structure.

FIG. 6 is a bottom plan view of the sleeve of FIG. 5.

FIG. 7 is a right end elevation of the sleeve of FIGS. 5 and 6.

FIG. 8 is a side elevation of a detent plate or disk carried in the housing and which is adapted to engage the head of the screw member in FIG. 1.

FIG. 9 is a rear elevation of the detent plate of FIG. 8.

FIG. 10 is a rear elevation of a rear cover plate which forms the closed rear end of the housing of the fastener construction.

FIG. 11 is a side elevation of the cover plate of FIG. 10.

FIG. 12 a front elevation of one of two ratchet rings carried in the housing of the fastener construction of FIG. 1.

FIG. 13 is a side elevation of the ratchet ring of FIG. 12.

FIG. 14 is a rear elevation of a second ratchet ring carried in the housing of the fastener construction of FIG. 1.

FIG. 15 is a side elevation of the ratchet ring of FIG. 14.

FIG. 16 is rear elevation of the front cover plate for the housing of the fastener construction of FIG. 1.

FIG. 17 is a side elevation of the cover plate of FIG. 16.

FIG. 18 is rear elevation of the tubular housing per se, of FIG. 1.

FIG. 19 is a section taken on line 19—19 of FIG. 18.

FIG. 20 is a side elevation of one type of fastener stud which can be employed with the fastener construction of FIG. 1, this construction constituting another embodiment of the invention.

FIG. 21 is a front elevation of the stud of FIG. 20.

FIG. 22 is a side elevation of the stud employed in the fastener construction of FIG. 1.

FIG. 23 is a front elevation of the stud of FIG. 22.

FIG. 24 is a rear elevation of a modified housing having a fluted interior surface, this constituting another embodiment of the invention.

FIG. 25 is a section taken on the line 25—25 of FIG. 24.

FIG. 26 is a top plan view of a retainer ring employed to hold captive the stud of FIG. 1 in an overlying panel.

FIG. 27 is a section taken on the line 27—27 of FIG. 26.

FIG. 28 is a front elevation of a modified housing construction for a panel fastener, wherein the housing can float a limited extent with respect to its mounting sleeve, and thus with respect to the underlying support surface, thereby to compensate for slight misalignments between the fastener studs carried on an overlying panel and the respective housings.

FIG. 29 is a side elevation of the housing construction of FIG. 28.

DESCRIPTION OF THE PREFERRED EMBODIMENT

Referring first to FIG. 1 there is illustrated in dotted outline a support structure generally designated 10, having an access opening 12 behind which there is mounted one part 14 of the present improved panel fastener device. The fastener part 14 is adapted to receive a threaded stud 16 of a cooperable fastener part, such stud being captive in a hole in an outer or overlying panel 18. The stud 16 when turned enables the panel 18 to be secured to the support structure 10 with a minimum of time and effort. The stud 16 in FIG. 1 is shown as occupying the aperture or opening 20 of the panel 18, such aperture having a conical portion 22 and a cylindrical portion 24. On the underside of the panel 18 there is a generally flat recess or counterbore 26 which is adapted to receive a retainer ring 28 to be described below.

Carried at the rear of the support structure 10 is a generally cylindrical housing 30 having a longitudinal bore 32, the front of the housing having a mounting plate 34 that is preferably welded to the housing. The plate 34 has an opening 36 in line with the access opening 12 of the support structure 10. The plate 34 is held by a sheet metal clamping member or sleeve 38, shown also in FIGS. 5-7, having two oppositely-disposed mounting holes 40 that align with corresponding holes in the support structure 10 to enable the clamping member 38 to be secured by suitable screws or rivets, etc., not shown. The clamping member 38 has four retainer ears 42 which are bent radially inwardly over the mounting plate 34 so as to secure the latter at the rear of the support structure 10 as shown in FIG. 1; preferably, the ears are somewhat loose fitting, and enable a limited side-to-side movement of the housing 30 and plate 34 for purposes of self-alignment.

Disposed mostly within the housing 30 is a screw member 44 having a head portion 46 and a threaded shank portion 48, the latter projecting forwardly just past the central opening in the clamping member 38. The undersurface 50 of the head of the screw member 44 engages a thrust washer 51 positioned by an internal annular shoulder 52 in the bore 32 of the housing 30 as shown.

Also, a pair of springs 54, 56 is provided, each being of different pitch from the other and having different diameters. The springs 54, 56 surround the threaded shank portion 48 of the screw member 44 as shown. The ends of the springs 54, 56 bear against the thrust washer 51 at the screw head 46 on the one hand, and against one of two ratchet rings on the other hand; the first ring is designated 58, and the second 60. The ring 58 is illustrated particularly in FIGS. 12 and 13, and the ring 60 in FIGS. 14 and 15. One face of the ring 58 has circumferentially-arranged radial sloped teeth 62 which are adapted to mate with corresponding radial sloped teeth 64 on the ring 60 when the two parts are superposed as in FIG. 1, the force of the springs 54, 56 biasing the rings into engagement with one another. The ring 58 has oppositely-disposed lugs 66, 68, which together with groove formations 70, 72 in the longitudinal bore 32 of the housing 30 constitute a keying means that permits relative sliding movement of the ring 58 along part of the length of the bore 32 but prevents relative rotation between the ring and housing 30. The lugs 66, 68 and the groove formations are clearly shown in FIG. 1. The remaining ring 60 also has two projections or lugs 74, 76 extending in an axial direction from that face which does not contain the teeth 64. These lugs are intended to be received in corresponding grooves or slots 78, 80 (FIG. 22) in the end of the stud 16 when the latter is positioned at the opening 12.

Referring again to FIG. 1, the stud 16 has a threaded bore 82 which can receive the threaded shank portion 48 of the screw member 44 when the stud is positioned over the access opening 12. The opposite, outer end of the stud 16 has a key formation, in this case an hexagonal recess 83, FIG. 23, for receiving a suitable tool in order to effect tightening of the stud on the screw member 44.

In accordance with the present invention, unique means are provided to mount the screw member 44 in the housing 30, including a yieldable detent or slip clutch for positively preventing relative turning movement of the screw member 44 in one direction with respect to the housing 30, and for yieldably restraining relative turning movement in the opposite direction. With regard to the yieldable restraint of the screw member, the latter will not turn when there is applied to it a torque less than a predetermined given figure, whereas it will turn when there is applied to it a torque in excess of the said predetermined, given figure. In addition, the mounting means permits a degree of looseness or play between the walls of the housing bore 32 and the head 46 of the screw member 44, to minimize the possibility of binding or jamming, which might result from slight misalignments between the screw member, housing and stud.

As part of such mounting, there is disposed between the undersurface 50 of the head 46 of the screw member 44 and the annular shoulder 52 in the housing, the thrust washer 51 mentioned above, constituting a thrust bearing.

The unique mounting provided by the present invention for the screw member 44 is in effect a positive one-way clutch or detent connected between the screw member and the housing 30, which permits it to have relative turning in one direction only if forcibly driven in such direction but positively prevents relative turning in the other direction regardless of the turning force applied.

To accomplish this, as illustrated in FIGS. 3 and 4, the outer or rear surface of the head 46 of the screw member 44 is provided with six uni-directional-acting cam teeth 90 which extend in radial directions, these being adapted to coact with six similar corresponding cam teeth 92 on a base or anchorage plate 94 particularly illustrated in FIGS. 8 and 9. The plate 94 is rigidly carried on a flatted hub 96 which is received in keying relation in a similarly shaped opening 98 in a rear end plate 100 of the housing 30. The plate 100 constitutes the closure for the rear of the housing, and is held in position by an inturned rear edge thereof, curled inward as shown after the various parts are inserted in the housing from the rear. The end plate 100 is illustrated in FIGS. 10 and 11, and has oppositely disposed lugs 102, 104 which are received in corresponding slots or grooves 106, 108 in the housing, FIG. 2.

As illustrated, the base plate 94 is not rigid with respect to either the end plate 100 or the housing 30, but instead there is disposed between the plate 100 and base plate 94 a pair of Belleville washers 110, 112. The central portions of the washers are preferably juxtaposed, with their peripheries being spaced apart, in order to provide the desired spring biasing action to the base plate 94. As can be readily understood, the plate 94 and its hub 96 can undergo limited movement axially of the housing 30, from the position shown in FIG. 1, toward the left, by a slight extent.

With such arrangement the screw member 44 can under special circumstances be forcibly turned but with restraint, clockwise as viewed from its right or small end. The restraint is provided by the cooperative cam teeth 90, 92 which click or cam past each other as their sloping sides engage and the washers 110, 112 yield. However, the screw member 44 is positively prevented from turning in the opposite or counterclockwise direction as viewed from the right, due to the non-sloping sides of the cam teeth 90, 92 becoming engaged with each other.

Such one-way positive restraint insures that, when the panel 18 is to be separated from the supporting structure 10 this can be accomplished without difficulty because a positive drive is had in effect as the stud 16 is turned in unscrewing direction due to the screw member 44 being positively held against counterclockwise turning. Thus, such circumstances as rusting or abrasion of the threads or the lodging of dirt thereon will not defeat the unscrewing of the fastener, which was not the case in the device of my prior application identified above.

The present fastener has a retainer ring 28 associated with the stud 16, for holding the latter captive in the panel 18 when it is not installed on the support surface. The ring 28 is shown in FIGS. 1, 26 and 27, and is seen to comprise a first cup shaped member 114 preferably constituted as a simple metal stamping, a second cup shaped member 118, and a spring 120 having a distorted or serpentine-like circular configuration, being characterized by wavelike undulations. The inner peripheral portions of the undulations define a first, relatively small diameter circle, and the outer peripheral portions define a second, larger circle. The dimensions are such that the spring has the configuration shown when not installed on the stud 16. The spring is seen to extend circumferentially through almost 360 degrees, with its opposite ends being juxtaposed. The ends of the spring are adjacent the outer periphery thereof. Aligned openings 122 and 124 in the cups 118 and 114 respectively are generally circular, and have roughly the same diameter, this being between that of the first and second circles mentioned above. The diameter of the openings 122 and 124 is sufficient to enable the ring 28 to be passed over the inner end of the stud 16 and slid over the cylindrical part thereof.

As shown in FIG. 22, the stud 16 has a conical portion 126 constituting one wall of a groove 128, and a second annular wall in the form of a shoulder 130, constituting the opposite groove wall. A lead-in formation 132 of conical configuration facilitates initial installation of the retainer ring 28 on the stud after the latter is inserted into the hole 20 in the panel 18. The dimensions of the annular shoulder 130 and spring 120 are such that the ring 28 can slide from the position illustrated in FIG. 1, to a position wherein the spring occupies the groove 128 when the panel 18 is free; however, the spring prevents complete release of the stud therefrom, thus eliminating the possibility of the stud becoming lost. The area adjacent to the conical head of the stud is frequently employed by maintenance personnel as a handle for carrying the panel about, or to facilitate positioning of the panel as required during installation. The retainer ring 28 has been found to be sufficiently rugged to prevent inadvertent separation of the stud and panel in the course of rough handling of this type.

The operation of the improved fastener construction of the present invention can now be readily understood by referring to FIG. 1. The housing 30 is permanently retained on the structure 10 at the rear of the access opening 12. The panel 18 can be installed and removed from the support structure 10, with the stud 16 being retained captive in the hole 20 of the panel 18 when the latter is removed. Although FIG. 1 shows but a single fastener, it will be understood that typically a number of similar fasteners are employed about the periphery of the panel 18, in order to provide multiple points of attachment to the understructure or support surface.

When it is desired to install the panel, the stud 16 is positioned over the appropriate access opening 12 such that the stud bore 82 aligns with the threaded shank portion 48 of the screw member 44. With a suitable tool engaging the outer keying configuration of the stud 16, such as an Allen wrench or spline, etc., the stud is rotated slowly clockwise until the internal threads thereof become engaged with the external threaded shank portion 48 of the screw member 44. As this is occurring, the lugs 74 and 76 of the ring 60 will be received in the slots 78, 80 of the stud 16, FIGS. 15 and 22, and the ratchet ring 60 will begin to turn with the stud. Since the ratchet ring 58 is keyed against rotation, the relative turning between the two rings will cause a clicking or by-pass of the teeth 62 and 64 against the action of the springs 54, 56. The detent effect of the ratchet rings and the springs is such that for every few degrees of turning there must be overcome the force of the springs in order to allow the teeth to by-pass; accordingly, resistance is encountered as the stud is threaded onto the screw member. In addition, however, resistance would also be encountered if the stud were unscrewed, and there is thus prevented inadvertent loosening of the stud 16 from the screw member 44 after installation, such as might otherwise occur under vibration.

As the stud 16 approaches its fully on position, the force of the springs 54 and 56 increases, and the torque required to either tighten or loosen the stud accordingly increases, this being the desired effect, since the maximum resistance to inadvertent loosening is needed when the stud is fully seated.

With prior devices of this type the proper amount of torque to be applied has involved substantial judgement on the part of the installer. In many cases, excessive torque has been applied, resulting from carelessness or lack of attention by such personnel.

By the present invention, the application of a clockwise torque to the stud 16 which exceeds a predetermined, given figure automatically renders operative the yieldable detent 46, 94, 110, 112 and the application of a sufficiently large counterclockwise torque positively results in an unscrewing of the stud 16 from the screw member 44. For the clockwise torque, the screw member 44 normally ultimately begins to rotate clockwise with the stud 16 after complete pull-up. During such ultimate rotation, the base plate 94 is periodically forced axially toward the left in FIG. 1, as the cam teeth 90 and 92 click past one another. The Belleville washers 110, 112 yield as this occurs. As a result, no reliance is placed on operator judgement, since the operating torque is automatically limited; overtightening and stripping of the threads of either the stud 16 or the screw member 44 thus cannot occur.

For the counterclockwise torque, the screw member 44 is positively held against counterclockwise rotation in the housing 30 by the cam teeth 90, 92 and anchor or base plate 94. Release of the panel 18 is thus assured at all times.

It is noted that there can exist a slight clearance space between the hub 96 for the anchor plate and the hole 98 in the end plate 100. Clearance space here minimizes possible problems with binding of the parts during the axial movement of the hub. Also, it allows for slight variances in the position of the head 46 of the screw member 44 within the housing. The Belleville washers tend to seat the base plate 94 properly in the absence of such variances, but at the same time permit a limited selfalignment to occur between the various parts of the device.

Additional clearance spaces can also exist between the head 46 of the screw member 44 and the housing bore 32, the outer periphery of the thrust washer 51 and the bore 32, the hole in the thrust washer 51 and the unthreaded portion of the screw member 44, and the outer peripheries of both ratchet rings 58 and 60 and the housing bore. These spaces permit smooth operation of the device, and thereby minimize the possibility of binding or jamming of the various moving parts. Freedom from malfunction and/or failure is considered extremely important in the present device, since panel fasteners of this general type are often employed in aircraft, and maintenance is frequently done in the field. Jamming of a part or stripping of a thread would pose substantial problems under such circumstances.

A modified form of stud is shown in FIG. 20, designated 16a. The construction is essentially like that of the first mentioned stud 16, with the exception of a different configuration for the head. Whereas the stud 16 was intended to be fully recessed in a countersunk hole in the panel 18, the stud 16a could be employed with other types of panels, where a flush surface configuration was not important. Again, the stud head is provided with a keying aperture 83a, for engagement by a suitable tool.

Another embodiment of the invention is shown in FIGS. 24 and 25, which depict a modified housing 30a that could be substituted for the housing 30 shown in FIGS. 1, 18 and 19. In place of the diametrically opposed longitudinal grooves 70 and 72 illustrated in FIGS. 1, 18 and 19, the bore of the housing 30a is provided with a fluted configuration 133 in the area where sliding movement of the ratchet rings 58 and 60 occurs. In this particular construction, the ratchet ring 58 of FIGS. 1, 12 and 13 could be modified slightly by merely rounding out the lugs 66, 68 thereof, such that they would occupy any pair of opposite grooves of the fluted bore 133 of the housing 30a. The ratchet ring 58 could thus slide axially of the housing, but would be restrained against turning with respect thereto. The ring 60 would rotate simultaneously with the stud, as in the previous construction.

While this construction has been found to be somewhat more expensive to produce than that of the previous figures, it has the advantage that initial positioning of the ratchet ring 58 would be simplified, since it could be installed in any one of a number of angular positions with respect to the housing as a result of the symmetry of the bore.

Still another modification of the fastener is illustrated in FIGS. 28 and 29, wherein the housing designated 30b is secured in floating relation to a modified sheet metal clamping member or sleeve 38b having four ears 42b which are disposed at roughly 45° with respect to the vertical axis of the member. By suitable formation of the ears 42b, a degree of lateral shifting of the housing 30b is made possible with respect to the member 38b, this being desirable in certain installations involving alignment of multiple fastener studs and multiple fastener housings. Misalignments sometimes result from bending or warping of the metal parts when they are subjected to stress, in combination with exposure to multiple heat/cooling cycles, or other harsh environmental factors which can cause permanent changes in the physical dimensions of such parts. In other respects the arrangement of FIGS. 28 and 29 is similar to that already discussed in connection with FIG. 1.

It is to be noted that with the present construction, not only is overtightening circumvented but also a positive loosening is always assured in addition to eliminating the possibility of forcing a stud onto a screw thread where the threads have not been "started" correctly. With respect to this latter, if the threads do not engage correctly at the onset of installation, rather than a possible stripping occurring, the yieldable detent located at the screw head will come into play, and there will be an immediate indication to the installer that a problem with this particular unit exists. It will thus be possible for the installer to positively back off on the stud, and "restart" the threads.

As can be readily understood, the housing essentially completely encloses and conceals the yieldable detent. This has the advantage of keeping dirt or debris out of the area, as well as discouraging tampering. Also, it is unlikely that the parts would be inadvertently damaged from bumping, jarring, etc. These are considered to be important advantages of the present invention.

From the above it can be seen that I have provided novel and improved fastener constructions which are both simple in their structure while at the same time being both rugged and reliable under relatively harsh conditions, such as vibration, and being capable of satisfactory operation over extended periods. By virtue of the one-directional torque limit feature being incorporated directly in the fastener housing, there is always a positive release insured for the fastener, with no possibility of damage during installation due to error on the part of maintenance personnel, regardless of whether they are employing manual tools or power operated drivers. Accordingly the chances of a malfunction or failure are greatly reduced as compared to operations involving the prior art devices.

The present fastener constructions thus constitute a distinct advance and improvement in this field.

Each and every one of the appended claims defines an aspect of the invention which is separate and distinct from all others, and accordingly each claim is to be treated in this manner when examined in the light of the prior art devices, in any determination of novelty or validity.

Variations and modifications are possible without departing from the spirit of the claims.

I claim:

1. A fastener for releasably securing a panel to an underlying supporting structure having an access opening, comprising in combination:
   (a) a tubular housing having a longitudinal bore,
   (b) means for securing said housing to the supporting structure, with the bore of the housing located at the access opening thereof,
   (c) a screw member carried in the housing bore, having a threaded portion extending toward an open end thereof and accessible from said access opening, said screw member having a head disposed in said housing,
   (d) the panel having an opening adapted to be located at the access opening in the supporting structure,
   (e) a stud having a bore with internal threads adapted to mate with the threaded portion of the screw member when the panel is placed over the supporting structure with its opening adjacent said access opening and the stud engaged with and turned with respect to the screw member,
   (f) a detent device in said housing for engagement by the stud to prevent inadvertent rotation thereof with respect to the housing and consequent loosening thereof on the screw member under conditions of vibration,
   (g) means providing a movable mounting for the screw member in the housing to enable turning movement, and
   (h) a yieldable uni-directional detent means carried by the housing and continually engaging the head of the screw member so as to normally prevent its turning in one direction during application of the stud to the threaded portion of the screw member except under conditions of excessive torque, thereby reducing the likelihood of damage occurring to the screw member or stud from possible overtightening,
   (i) said uni-directional detent means at all times positively preventing turning of the screw member in the opposite direction so as to insure removal of the stud therefrom when the latter is turned in unscrewing direction.

2. A fastener as defined in claim 1, wherein:
   (a) said means providing a movable mounting for the screw member comprises an annular shoulder in the bore of the housing,
   (b) a washer engaging said shoulder,
   (c) said washer being disposed between shoulder and the head of the screw member, and constituting a thrust bearing for enabling turning of the screw member to occur.

3. A fastener as defined in claim 1, wherein:
   (a) said yieldable detent means comprises means defining a plurality of cam teeth on the head of the screw member,
   (b) a plate disposed in the housing adjacent the screw member head,
   (c) said plate having a plurality of cam teeth about its periphery adapted to cooperate with the cam teeth on the screw member head to permit relative turning movement in one direction and prevent relative turning movement in the other direction,
   (d) means connected with the plate, keying the latter to the housing, and
   (e) spring means biasing the plate into engagement with the head of the screw member such that the cam teeth on the latter are normally biased to forcibly engage the cam teeth on the plate, and the screw member is thereby normally retained against turning in one direction with respect to the stud except under said conditions of excessive torque.

4. A fastener as defined in claim 3, wherein:
   (a) said housing is closed at one end,
   (b) said spring means comprising a Belleville washer disposed between the said closed end of the housing and the plate.

5. A fastener as defined in claim 3, wherein:
   (a) said housing is closed at one end,
   (b) said spring means comprising a pair of Belleville washers disposed between the said closed end of the housing and the plate,
   (c) said washers having their centers juxtaposed and their peripheries in spaced relation with respect to one another.

6. A fastener as defined in claim 1, wherein:
   (a) said yieldable detent means comprises means defining a plurality of cam teeth on the head of the screw member,
   (b) a plate disposed in the housing adjacent the screw member head, having follower means cooperable with said cam teeth,
   (c) spring means disposed in the housing and biasing the plate into engagement with the head of the screw member, and
   (d) keying means disposed on the housing and connected with said plate, for preventing relative rotation between the plate and housing and for providing a floating connection therebetween, so as to enable limited self-alignment of the plate to occur with respect to the screw member head.

7. A fastener as defined in claim 6, wherein:
   (a) said keying means comprises an end cover plate for the housing, having a keying aperture in the center thereof,
   (b) a shaft rigidly connected with the plate, and having an external surface configuration enabling it to be received in non-rotating relation in the keying aperture of the end cover plate.

8. A fastener as defined in claim 1, and further including:
   (a) means defining a floating connection between the housing and the supporting structure to compensate for slight misalignments between the stud and panel, and the access opening.

9. A fastener as defined in claim 1, and further including:
   (a) a sheet metal clamping ring joining the housing to the rear of the supporting surface, at the access opening thereof.

10. A fastener as defined in claim 1, wherein:
    (a) said yieldable detent means comprises a plate member, and
    (b) cooperable cam teeth on said members, adapted to uni-directionally by-pass each other.

11. A fastener as defined in claim 1, wherein:
    (a) said yieldable detent means comprises a disk-like abutment member,
    (b) camming means on said members, providing a one-way rotary drive therebetween,
    (c) the cross dimension of said disk-like member being sufficiently less than the bore diameter to permit lateral shifting of the disk-like member if required, in order that the camming means on the members can align properly with each other.

12. A fastener as defined in claim 1, wherein:
(a) said yieldable detent means comprises a disk-like abutment member,
(b) camming means on said members, providing a one-way rotary drive therebetween,
(c) said screw member having a head, and the cross dimension of said head being sufficiently less than the bore diameter so as to permit lateral shifting of the screw member if required, in order that the camming means on the members can align properly with each other.

13. A fastener as defined in claim 1, wherein:
(a) said yieldable detent means comprises a disk-like abutment member, and
(b) keying means between the abutment member and the housing, permitting both limited lateral shifting of the abutment member, and limited axial shifting thereof in the housing.

14. A fastener as defined in claim 1, wherein:
(a) said housing has an internal annular shoulder,
(b) a thrust washer disposed against said shoulder, and
(c) said yieldable detent means comprising means normally biasing the head of said screw member into engagement with said thrust washer, and also permitting limited lateral shifting of the screw member within said housing bore.

15. A fastener as defined in claim 1, wherein:
(a) the yieldable detent means is disposed completely within said housing, so as to be essentially completely inaccessible from the exterior thereof, thereby being resistant to inadvertent damage and tampering.

16. A fastener as defined in claim 1, wherein:
(a) the yieldable detent means is completely concealed by said housing, so as to be essentially completely inaccessible from the exterior thereof.

17. A fastener as defined in claim 1, wherein:
(a) said housing constitutes an enclosure to keep debris from contact with the said yieldable detent means.

18. A fastener as defined in claim 1, wherein:
(a) said detent device and said yieldable detent means are separate and distinct from one another.

* * * * *